United States Patent [19]
Strozier

[11] Patent Number: 4,909,889
[45] Date of Patent: Mar. 20, 1990

[54] WOOD LAMINATING FIXTURE

[75] Inventor: Robert E. Strozier, Atlanta, Ga.

[73] Assignee: Lee & Strozier Millworking Machinery Corp., Inc., Atlanta, Ga.

[21] Appl. No.: 150,635

[22] Filed: Feb. 1, 1988

[51] Int. Cl.[4] ................................ B32B 3/00

[52] U.S. Cl. ................................ 156/443; 144/256.1; 144/266

[58] Field of Search ................ 156/443; 144/349, 381, 144/256.1, 256.3, 263, 266

[56] References Cited

U.S. PATENT DOCUMENTS

| | | | |
|---|---|---|---|
| 874,406 | 12/1907 | Johnson | 144/256.3 X |
| 927,975 | 7/1909 | Kaufman et al. | |
| 1,019,472 | 3/1912 | Hilger | 144/256.1 |
| 1,122,750 | 12/1914 | Hice | 144/263 |
| 1,561,613 | 11/1925 | McKeown | |
| 2,331,972 | 10/1943 | Greevy | 144/279 |
| 2,399,348 | 4/1946 | Hobbs | 144/256 |
| 2,796,095 | 6/1957 | Joseph | 144/291 |
| 2,982,332 | 5/1961 | Garrett | 100/211 X |
| 3,027,923 | 4/1962 | Schreiber | 144/256.1 |
| 3,063,483 | 11/1962 | Schumacher | 144/266 |
| 4,141,775 | 2/1979 | Williams et al. | 156/358 |

OTHER PUBLICATIONS

Four photographs of second bending and laminating machine in the Federal Republic of Germany (West Germany).

Casati Macchine ARC50 arch bending machine available from Casati Macchine at 20027 Rescaldina (MI), Italy.

Stegherr RP and RSP bending and laminating fixtures available from Stegherr Maschinenbau GmbH and Co. K.G., Donaustaufer Strabe 30–Postbox 120449, D-8400 Regensburg 12, West Germany.

Four photographs of a bending and laminating machine in the Federal Republic of Germany (West Germany).

*Primary Examiner*—David Simmons
*Attorney, Agent, or Firm*—Kilpatrick & Cody

[57] ABSTRACT

A wood bending and laminating fixture for forming curved millwork members, particularly such members utilized to construct windows having curved tops. An adjustable height platform receives interchangeable plywood form plates of a variety of desired shapes and sizes, and a rack from which a belt is suspended is forced away from the platform with a hydraulic jack in order to draw the belt against the periphery of the forming plates in order to bend and apply pressure to the workpiece between the forming plates and the belt. Movable rods are received in a series of holes in rack arms in order to move the points within the rack from which the belt is suspended and shorten or lengthen the working length of the belt. A bout former makes possible formation of curved workpieces which include a reverse curve.

5 Claims, 3 Drawing Sheets

WOOD LAMINATING FIXTURE

BACKGROUND OF THE INVENTION

The present invention relates to equipment for bending and pressing wood laminations into curved forms.

Curved wood forms have long been used in a variety of applications. Curves desired include cyma curves, arcs, circles, S-curves and other shapes. Production of wood members having a desired curved form has previously been achieved by utilizing wood which grew in that form, by cutting the form from stock large enough to accommodate the curve, by steam-bending techniques, and by glue laminating thin layers of wood which can easily be bent into the desired form prior to bonding the laminations together. Curved members formed of laminations are highly desirable in many applications because of the superior strength and stability of such members as compared to solid wood structures of the same size and shape and because very tight curves can be achieved.

Production of large-scale, multi-lamination wood forms is difficult, however, because of the need for a means for bending the laminations to and holding them in precisely the correct shape and relationship for a sufficient period of time to permit the adhesive or glue being used to cure. This must normally be accomplished by applying substantial amounts of opposing pressure normal to and distributed over substantially all of both sides of a workpiece made up of multiple layers of wood and uncured adhesive or glue.

A variety of shop-built and commercial machinery has previously been used to fabricate such curved members, including the Casati Macchine ARC50 arch bending machine available from Casati Macchine at 20027 Rescaldina (MI), Italy; the Stegherr RP and RSP bending and laminating fixtures available from Stegherr Maschinenbau GmbH and Co. K.G., Donaustaufer Strabe-30-Postbox 120449, D-8400 Regensburg 12, West Germany; and the devices disclosed in U.S. Pat. Nos. 927,975, 1,561,613, 2,331,972, 2,399,348, 2,796,096 and 4,141,775.

While many of the prior art machines can be successfully used to produce curved wood members, all of the prior art equipment is very expensive, difficult to use or difficult to adapt rapidly to production of different sizes of curved members. Furthermore, few of the prior art approaches can produce members having reverse curves.

Despite the deficiencies of the prior art equipment and techniques available for fabricating "half-round top" window and door frames by glue lamination of thin wood layers, the demand for such windows, doors and other architectural structures having similar curves has expanded enormously with the growth in the popularity of post-modern architecture.

Consequently, there is an increased need for a curve-forming laminating fixture which is economical, easy to operate, utilizes a minimum amount of shop floor space, and of substantial importance, which can accommodate a variety of frame sizes economically and easily.

SUMMARY OF THE INVENTION

The wood laminate bending and gluing fixture of the present invention utilizes an adjustable-length belt attached to a rack to draw laminations against the edges of curve-defining plates or solid or hollow patterns. The belt is tensioned by movement of the rack away from the plates utilizing a hydraulic jack. The fixture operates vertically so that it occupies a minimum amount of floor space and provides convenient access to the portion of the machine where laminations are positioned. The curve-defining plates may be made of plywood, particle board or other similar, easily-worked materials and are rapidly interchangeable. Belt length may likewise be easily adjusted, thus making it very simple to adapt the fixture to produce different sizes of window frames or other curved wood members.

The present invention thus provides a reliable and economical fixture for lamination of veneers and bending plywood into curved members in a wide variety of shapes and sizes.

Other features and benefits of the present invention will become apparent by reference to the following description of the invention and the accompanying drawings.

DETAILED DESCRIPTION OF THE DRAWINGS

Figure 1:
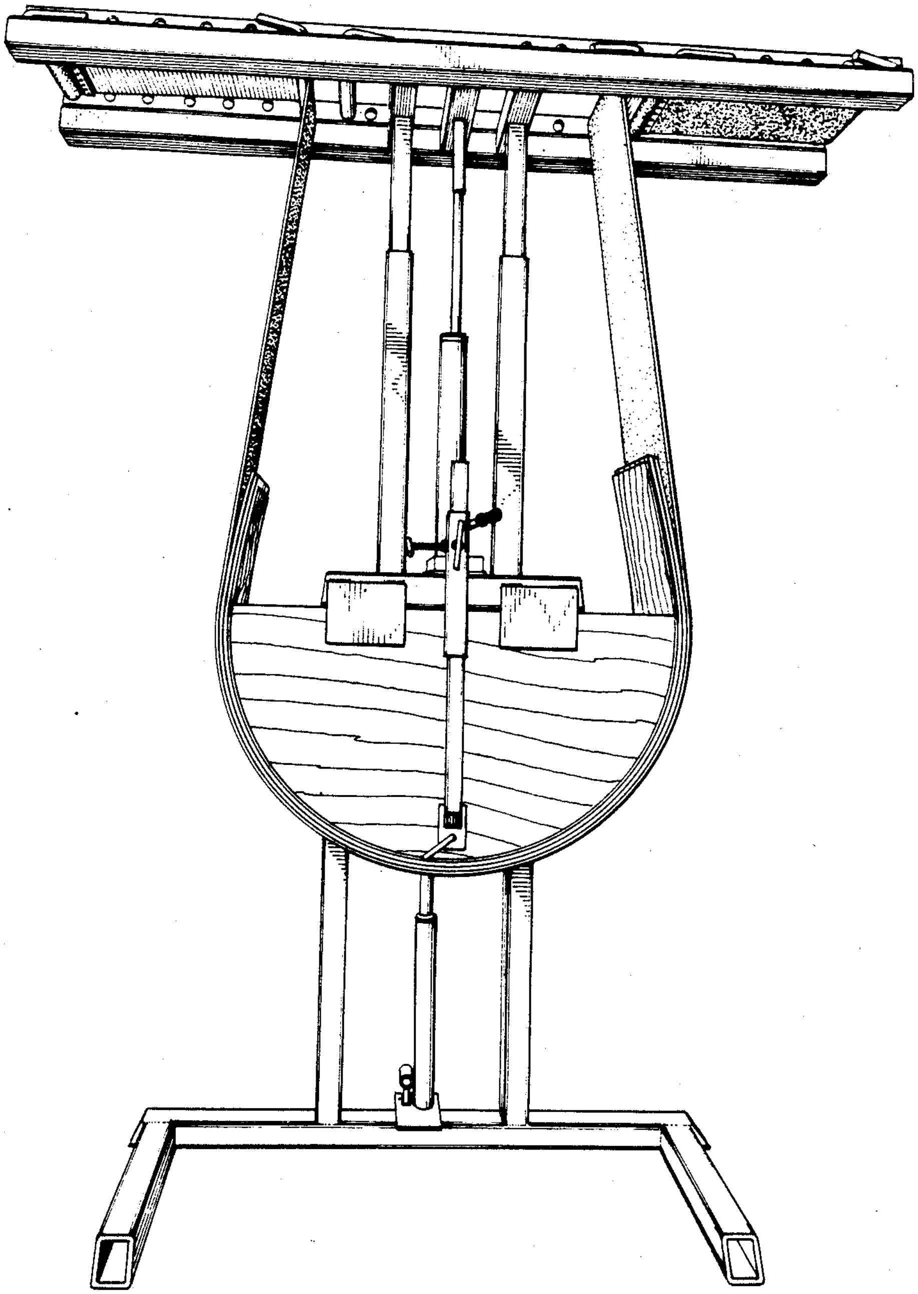
FIG. 1 is a front perspective view of the laminating fixture of the present invention shown with a workpiece in place and the belt tensioned.
Figure 3:
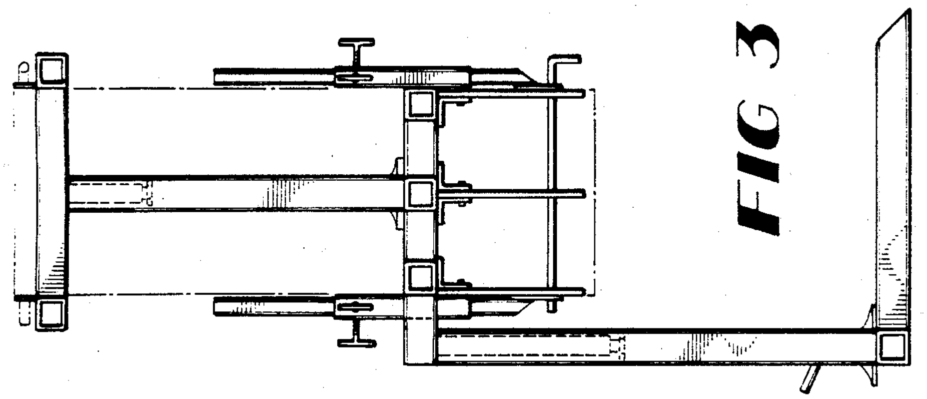
FIG. 3 is a left-side elevation view of the laminating fixture of the present invention with the belt shown in phantom lines.
Figure 2:
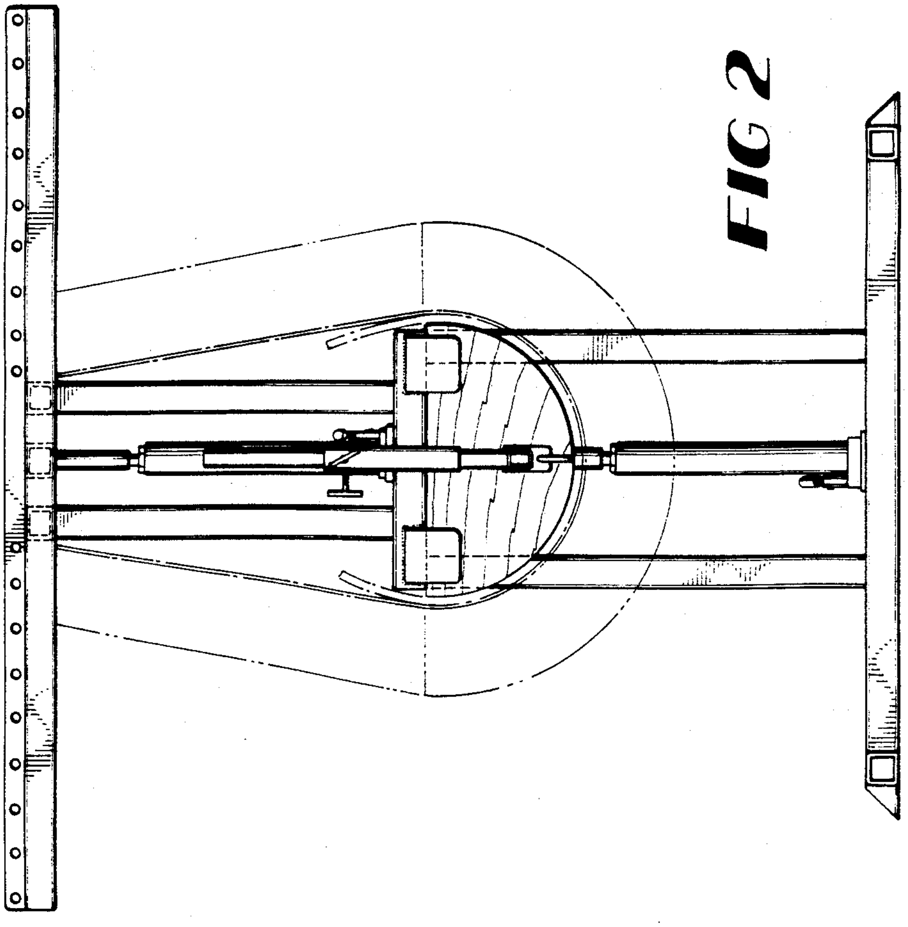
FIG. 2 is a front elevation of the laminating fixture of the present invention with illustrative alternative belt positions shown in phantom lines.

Referring to FIGS. 1–3, bending fixture 10 comprises generally a base 12 which supports stanchion 14. A platform 16 cantilevered from stanchion 14 holds form plates 18, and a rack 20 pulls the ends of belt 22 so that belt 22 is drawn tightly around form plates 18 in order to draw the laminations of workpiece 24 against form plates 18, thereby compressing the laminations together and conforming them to the curved shape of form plates 18. Rack 20 is forced away from platform 16 by a hydraulic jack 26 in order to tension belt 22.

As will be apparent by reference to the drawings, bending fixture 10 of the present invention may be fabricated of commonly available materials, including square or round steel tubing, right angle steel sections, steel plate, and steel rods. Belt 22 may be a conveyor belting available from Georgia Duck and Cordage Mill, Scottdale, Georgia 30079.

Base 12 may be fabricated utilizing a lateral section of square or round steel tubing 28 to which base arms 30 are attached at right angles near its ends, thereby providing an economical base which does not obstruct access to the platform 16 when the bending fixture 10 is in use. Stanchion 14 comprises simply two square (or round) steel tube uprights 32 welded to base 12 lateral member 28. The upper ends of uprights 32 receive platform supports 34, which are steel tubes which depend from the rear of platform 16 and telescope into the tops of uprights 32. One of the platform supports 34 is shown in phantom lines in FIG. 3.

A second hydraulic jack 36 positioned between base 12 lateral base member 28 and platform 16 may be used to raise and lower platform 16 in order to position it at a convenient height, depending on the size of form plates 18 currently in use. Pins 38 (shown in phantom lines in FIG. 3) may be inserted through holes in uprights 32 to stop the downward travel of platform support 34, thereby locking platform 34 in a desired location and permitting removal of hydraulic jack 36 until it is desired that the height of platform 16 be changed. Pins 38 also prevent overtravel of platform 16. Jack 36 may also be used to lower platform 16 with curve defining plates 18 attached so that laminations 24 are squeezed between plates 18 and matching plates or forms mounted on base 12 or resting on the floor.

Platform 16 may be fabricated primarily of square steel tubing, as is illustrated in the figures, but it could be fabricated from a variety of other appropriate materials, as will be apparent to one skilled in the art. In the embodiment illustrated in the figures, platform 16 comprises three lateral tubing beams 40 interconnected by front and rear tubing stubs 42 and 44 to produce a relatively square grid. Two stubs 46 protrude from the rear platform 16 to join platform supports 34 so that platform 16 is cantilevered from platform supports 34 and, therefore, from stanchion 14 uprights 32.

In the illustrated embodiment, three form plates 18 hang from the underside of platform 16. One form plate 18 may be held in a clip formed by affixing facing strips of angle iron 48 centrally on the underside of platform 16 spaced apart the thickness of one form plate 18, normally approximately three-fourths of an inch. Similar clips are formed on the front and rear edges of platform 16 utilizing one length of angle iron 48 facing two plates 50 (which plates 50 are clearly visible in FIGS. 1 and 2). If desired, bolts or pins may be inserted through holes in angle iron 48 and plates 50 and corresponding holes in form plates 18 in order to lock those plates in position. Additional alignment of form plates 18 is achieved by passing a form plate rod 52 through the central portion of the plates 18 near their lower edges. The embodiment of the present invention shown in the figures illustrates one such form plate rod 52, but additional rods could similarly be used where desirable with larger form plates 18 than those illustrated. Form plate rod 52 is received in the ends of front and rear rod supports 54 which, in the illustrated embodiment, are fabricated by telescoping a length of tubing 56 through a larger tube 58 which is oriented vertically and is welded to the front or back, as the case may be, of platform 16. Set screws 60 lock each tube 56 in position within larger tube 58. A rod support plate 62 is welded to the lower end of each tubing member 56 in a position to lie against and thus provide support for each of the outer form plates 18. Form plate rod 52 passes through holes in plates 62. As will be appreciated by one skilled in the art, any appropriate number of form plates 18 may be used as necessary to provide appropriate support to the workpiece 24, depending on the width, size and shape of the workpiece 24 being fabricated.

Support for the belt rack 20 is provided by two tubing pillars 64 which are mounted to stand upright on the top of platform 16 along its lateral centerline. Rack 20 is attached to rack support tubes 66 which telescope into the tops of pillars 64.

The position of rack 20 is, as explained above, adjusted by hydraulic jack 26 which is positioned between rack 20 and platform 16 and between pillars 64, so that rack 20 is forced away from platform 16 as jack 26 is extended.

Rack 20 may be fabricated of two parallel square tubing rack arms 68 interconnected by parallel square tubing spacers 70, which rest on the tops of support tubes 66 and hydraulic jack 26. Parallel lengths of angle iron 72 with matching holes 74 are affixed on top of rack arms 68. Rack arms 68 are spaced apart the width of belt 22, and the ends of belt 22, each of which form loops 76 positioned between rack arms 68, are received on belt rods 78 which pass through corresponding holes 74 in angle irons 72. Additional belt rods 78 may be positioned at any desired locations along rack 20 in order to cause belt 22 to hang from rack 20 with the desired spacing and in order to reduce the length of belt 22 which hangs from rack 20 by looping belt 22 over rods 78 in order to achieve a desired belt 22 working length. Desired belt 22 length could also be achieved by rolling surplus belt on ratcheted drums.

As will be readily appreciated by reference to the figures, operation of the bending and laminating fixture 10 of the present invention is straightforward. Form plates 18 having the desired size and contour are fabricated from plywood or other convenient material and mounted on the underside of platform 16, after the height of platform 16 has been adjusted to a convenient level by operation of hydraulic jack 36. Belt rods 78 are positioned to cause belt 22 to hang from rack 20 at points equally distant from the center of rack 22 and spaced apart a distance slightly less than the width of form plates 18 (as is illustrated in FIGS. 1 and 2). Belt rods 78 are also adjusted to cause an appropriate length of belt 22 to hang from rack 20 so that sufficient space is available when rack 20 is in its lowermost position to allow laminations 24 to be inserted in the fixture 10, but so that belt 22 can be adequately tightened against laminations 24 by extending hydraulic jack 26 without exceeding the limit of upward travel of rack 20 provided by the jack 26.

An alternative size form plate 18' and the corresponding belt 22 position is shown by phantom lines in FIG. 2.

Figure 4:
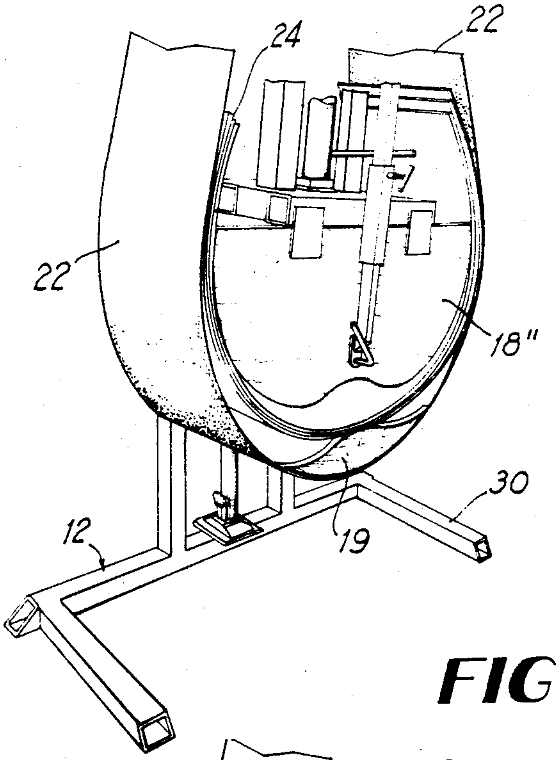
FIG. 4 is a front perspective view of a portion of the laminating fixture of the present invention shown with a bout-forming support to produce a workpiece having a reverse curve.
Figure 5:
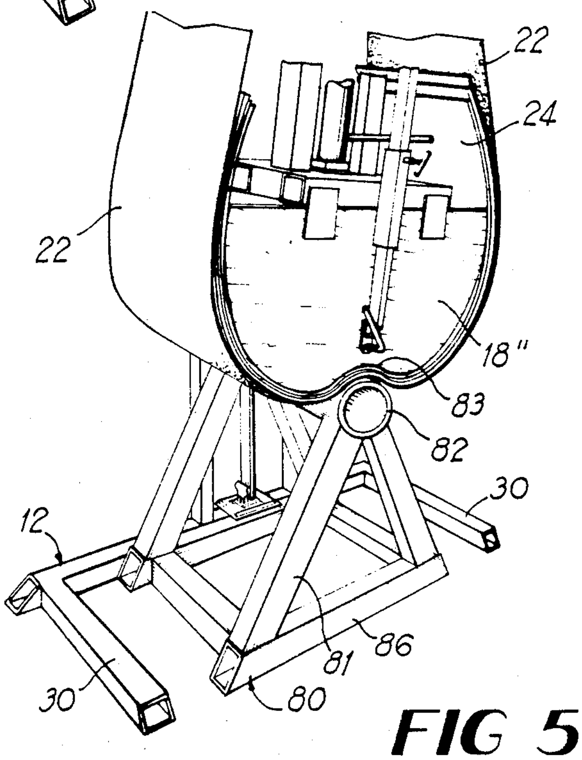

FIGS. 1–3 illustrate utilization of bending fixture 10 to form a "half-round" laminated member 24. Other shapes may, however, be formed on fixture 10 utilizing appropriately shaped form plates 18" as is illustrated in FIGS. 4 and 5. Those shapes include sections of ovals and ellipses. Additionally, reverse curves can be achieved as illustrated in FIG. 4 utilizing bout-forming plates 19 between belt 22 and laminations 24 or as illustrated in FIG. 5 utilizing a bout-forming support 80. Bout forming plates 19 match the bout 83 in plates 18" and press laminations 24 into that bout when belt 22 is tightened. Bout support 80 in FIG. 5 is simply an appropriate stand 81 which rests between the arms 30 of base 12 to support a bout former 82. Bout former 82 may be a member of any appropriate shape to support and press the belt 22 against workpiece 24 in the vicinity of the reverse curve 83 being formed. Former 82 will normally be a rod or round tube having approximately the same radius as the reverse curve or bout 83 being formed in the workpiece. In the embodiment illustrated in FIG. 5, bout former 82 is a length of round tubing, and stand 80 further comprises splayed supports 84 which rest on a base 86.

In using bout-forming support 80 illustrated in FIG. 5, bending fixture 10 is operated as described above, except that after the laminations 24 are inserted between form plates 18" and belt 22, platform 16 is lowered by operating hydraulic jack 36, until laminations 24 are firmly pressed into the reverse curve or bout 83 by bout former 82 acting against belt 22. Belt 22 is then tensioned by operation of hydraulic jack 26 against rack 20 as described above.

Persons skilled in the art will readily recognize that other embodiments of the above-described invention may be easily constructed and utilized while continuing to realize the advantages of the described invention and without departing from the scope and spirit of the preceding description of the invention and the following claims.

I claim:

1. A wood laminating fixture for producing curved wood forms from a plurality of wood laminations utilizing a plurality of form plates, comprising a movable platform for receiving the form plates, a belt for drawing the wood laminations against the periphery of the form plates, a rack comprising a pair of parallel arms having corresponding holes for receiving movable rods to receive the ends of the belt and over which the belt may be looped to permit adjustment of the belt working length, and a hydraulic jack for forcing the rack away from the platform in order to apply tension to the belt and thereby draw the wood laminations against the form plates.

2. The laminating fixture of claim 7, further comprising a bout former against which the form plates may be pressed in order to produce a curved wood form which includes a reverse curve.

3. The laminating fixture of claim 2, further comprising a bout-forming member between the belt and the wood laminations to press the laminations into a bout in the form plates in order to produce a curved wood form which includes a reverse curve.

4. A wood laminating fixture for producing curved wood forms from a plurality of wood laminations utilizing at least one form plate, comprising a platform for receiving the form plate, a belt for drawing the wood laminations against the periphery of the form plate, a rack fixedly to receive the ends of the belt and permit adjustment of the belt working length comprising a pair of parallel arms having corresponding holes for receiving movable rods over which the belt may be looped or to which the belt ends may be attached, a hydraulic jack positioned between the platform and for applying tension to the belt by moving the rack, and a base and stanchion for supporting the platform and adjusting the platform height.

5. A wood laminating fixture for producing curved wood forms from a plurality of wood laminations comprising a platform for receiving at least one of a variety of sizes and shapes of form plates, a belt for drawing the wood laminations against the periphery of the form plate, a rack fixedly to receive the ends of the belt at positions corresponding to the widths of the form plates usable in the fixture and permit adjustment of the belt working length, a hydraulic jack positioned between the platform and the rack and a base and stanchion for supporting the platform and adjusting the platform height.

* * * * *